(12) United States Patent
Zander et al.

(10) Patent No.: US 10,988,122 B2
(45) Date of Patent: Apr. 27, 2021

(54) HYDRAULIC BLOCK FOR A HYDRAULIC ASSEMBLY OF A BRAKE PRESSURE CONTROL SYSTEM OF A HYDRAULIC VEHICLE BRAKE SYSTEM

(71) Applicant: Robert Bosch GmbH, Stuttgart (DE)

(72) Inventors: Thomas Zander, Oberstaufen (DE); Bernd Lutz, Kempten (DE); Michael Loeffler, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/442,326

(22) Filed: Jun. 14, 2019

(65) Prior Publication Data

US 2020/0017089 A1    Jan. 16, 2020

(30) Foreign Application Priority Data

Jul. 10, 2018  (DE) ..................... 10 2018 211 435.8

(51) Int. Cl.
  *B60T 8/36* (2006.01)
  *B60T 8/40* (2006.01)
  *B60T 15/36* (2006.01)

(52) U.S. Cl.
  CPC ............ *B60T 8/4031* (2013.01); *B60T 8/368* (2013.01); *B60T 15/36* (2013.01)

(58) Field of Classification Search
  CPC ....... B60T 8/368; B60T 8/4031; B60T 8/3645; B60T 8/3675; B60T 15/36
  USPC ..................................... 303/119.3
  See application file for complete search history.

(56) References Cited

U.S. PATENT DOCUMENTS

| | | | | |
|---|---|---|---|---|
| 5,409,303 | A * | 4/1995 | Engelbert | B60T 8/1708 188/170 |
| 8,020,946 | B2 * | 9/2011 | Iyatani | F15B 13/0814 303/119.1 |
| 9,039,104 | B2 * | 5/2015 | Weh | B60T 8/368 303/119.3 |
| 10,214,191 | B2 * | 2/2019 | Dreyer | B60T 8/3675 |
| 2005/0103390 | A1 * | 5/2005 | Yang | B60T 8/368 137/884 |
| 2005/0104442 | A1 * | 5/2005 | Yang | B29C 45/14 303/113.1 |
| 2012/0326495 | A1 * | 12/2012 | Trageser | B60T 8/4291 303/119.2 |
| 2013/0306180 | A1 * | 11/2013 | Weh | B60T 8/368 137/884 |
| 2016/0280197 | A1 * | 9/2016 | Mayr | B60T 17/02 |
| 2017/0253224 | A1 * | 9/2017 | Dreyer | B60T 8/3675 |
| 2018/0154877 | A1 * | 6/2018 | Grebe | C08K 7/14 |
| 2019/0031164 | A1 * | 1/2019 | Tandler | B60T 8/368 |

(Continued)

FOREIGN PATENT DOCUMENTS

DE  10 2006 059 924 A1    6/2008
DE    102016202113 A1 *  8/2017 ............. B60T 8/368

*Primary Examiner* — Thomas W Irvin
(74) *Attorney, Agent, or Firm* — Maginot, Moore & Beck LLP

(57) ABSTRACT

A hydraulic block for a hydraulic assembly of a slip control system of a hydraulic vehicle brake system includes a metal-plastic composite part with a metal part and a further part. The metal part includes sleeve-like brake line ports, sleeve-like valve receptacles, sleeve-like pump receptacles, and pipes as connecting lines. The further part is a plastic part that is injection-molded around the metal part to form the hydraulic block in a cuboid shape.

6 Claims, 2 Drawing Sheets

(56) References Cited

U.S. PATENT DOCUMENTS

| | | | |
|---|---|---|---|
| 2019/0111903 A1* | 4/2019 | Weh | B60T 8/341 |
| 2019/0210576 A1* | 7/2019 | Zander | F15B 13/0814 |
| 2019/0344767 A1* | 11/2019 | Bareiss | B60T 7/042 |
| 2020/0070798 A1* | 3/2020 | Zander | B60T 8/368 |
| 2020/0094800 A1* | 3/2020 | Zander | B60T 17/043 |

* cited by examiner

HYDRAULIC BLOCK FOR A HYDRAULIC ASSEMBLY OF A BRAKE PRESSURE CONTROL SYSTEM OF A HYDRAULIC VEHICLE BRAKE SYSTEM

This application claims priority under 35 U.S.C. § 119 to patent application no. DE 10 2018 211 435.8, filed on Jul. 10, 2018 in Germany, the disclosure of which is incorporated herein by reference in its entirety.

BACKGROUND

The disclosure concerns a hydraulic block for a hydraulic assembly of a brake pressure control system of a hydraulic vehicle brake system.

The term "brake pressure control system" means for example a system for controlling a hydraulic brake pressure on external power braking and/or slip control. Slip control systems are for example anti-lock brake systems, traction control systems and driving dynamic control systems, wherein the latter is also known as an electronic stability program and colloquially as an anti-skid system. These slip control systems are conventionally known under the abbreviations ABS, ASR, FDR and ESP. Such brake pressure control systems are well known and are not explained in detail here.

Hydraulic blocks serve for mechanical fixing and hydraulic connection of components of the brake pressure control system. "Connection" here means a hydraulic connection of the components according to a hydraulic circuit diagram of the brake pressure control system. Such components include solenoid valves, hydraulic pumps, check valves, damper chambers, hydraulic accumulators, pressure sensors, an electric motor for driving the hydraulic pumps, and an electronic control unit for controlling the components or for controlling the brake pressure. The electric motor and the electronic control unit are normally arranged on the outside of the hydraulic block. Typically, hydraulic blocks for brake pressure control systems comprise brake line ports, valve receptacles, pump receptacles and receptacles for further components of the brake pressure control system, and connecting lines which connect the brake line ports and receptacles according to the hydraulic circuit diagram of the brake pressure control system. The receptacles are typically blind holes of stepped diameter in which the components are arranged. The brake line ports are typically also blind holes for connection of brake lines, which lead from a brake master cylinder and/or to hydraulic wheel brakes, by means for example of screw or press-in nipples. The components may be fully recessed into their receptacles in the hydraulic block, for example in the case of hydraulic pumps, or partially recessed into the hydraulic block and otherwise protruding from the hydraulic block, such as for example solenoid valves, the hydraulic parts of which are typically arranged in the valve receptacles and the electromechanical parts of which protrude from the hydraulic block. The hydraulic parts of the solenoid valves form the valve itself and are actuated by the electromechanical parts, in particular an armature and a magnetic coil.

Equipped with the components of the brake pressure control system, such a hydraulic block can be described as a hydraulic assembly.

Publication DE 10 2006 059 924 A1 discloses a cuboid hydraulic block for a hydraulic assembly of a brake pressure control system of a hydraulic vehicle brake system with brake line ports, valve receptacles, pump receptacles and receptacles for hydraulic accumulators, damper chambers and pressure sensors.

Normally, such hydraulic blocks are cut from bars with rectangular cross-section made by extrusion of a metal, namely an aluminum alloy, and then machined to remove material. The surfaces of the hydraulic block are milled and the brake line ports, receptacles for the components of the brake pressure control system and the connecting lines are bored. On the outside of the hydraulic block, the connecting lines must be closed pressure-tightly, which is often achieved by press-fitting a sphere.

SUMMARY

The hydraulic block according to the disclosure is a metal composite part with a metal part embedded in another part. The other part preferably consists of plastic and is in particular formed, for example cast or injection-molded, around the metal part so that the metal part is embedded in the other part.

The metal part comprises brake line ports, valve receptacles, pump receptacles and connecting lines. The metal part may comprise all or just some of the brake line ports, valve receptacles, pump receptacles and connecting lines of the hydraulic block. The metal part may also comprise receptacles for further components of the brake pressure control system.

One advantage of the disclosure is that it requires little or no machining by material removal. For example, surfaces may be machined (or finished) by material removal. Such surfaces may for example be the inner peripheral faces of the brake line ports, valve receptacles, pump receptacles and receptacles for other components of the brake pressure control system. Outer faces of the hydraulic block for attachment of the electric motor and/or electronic control unit may also be machined by material removal.

A further advantage of the disclosure is a possibility of complex line routing, meaning that the connecting lines—in contrast to production by boring—need not be straight but may also be curved and/or angled. The connecting lines terminate in particular inside the hydraulic block and need not be closed on the surfaces of the hydraulic block.

The dependent claims describe refinements and advantageous embodiments of the disclosure.

All features disclosed in the description and the drawings may be implemented individually or in principle in any combination in exemplary embodiments of the disclosure. Embodiments of the disclosure are in principle possible which contain not all but only one or more features of a claim.

BRIEF DESCRIPTION OF THE DRAWINGS

The disclosure is explained in more detail below with reference to an embodiment shown in the drawing. The drawing shows.

DETAILED DESCRIPTION

Figure 1:
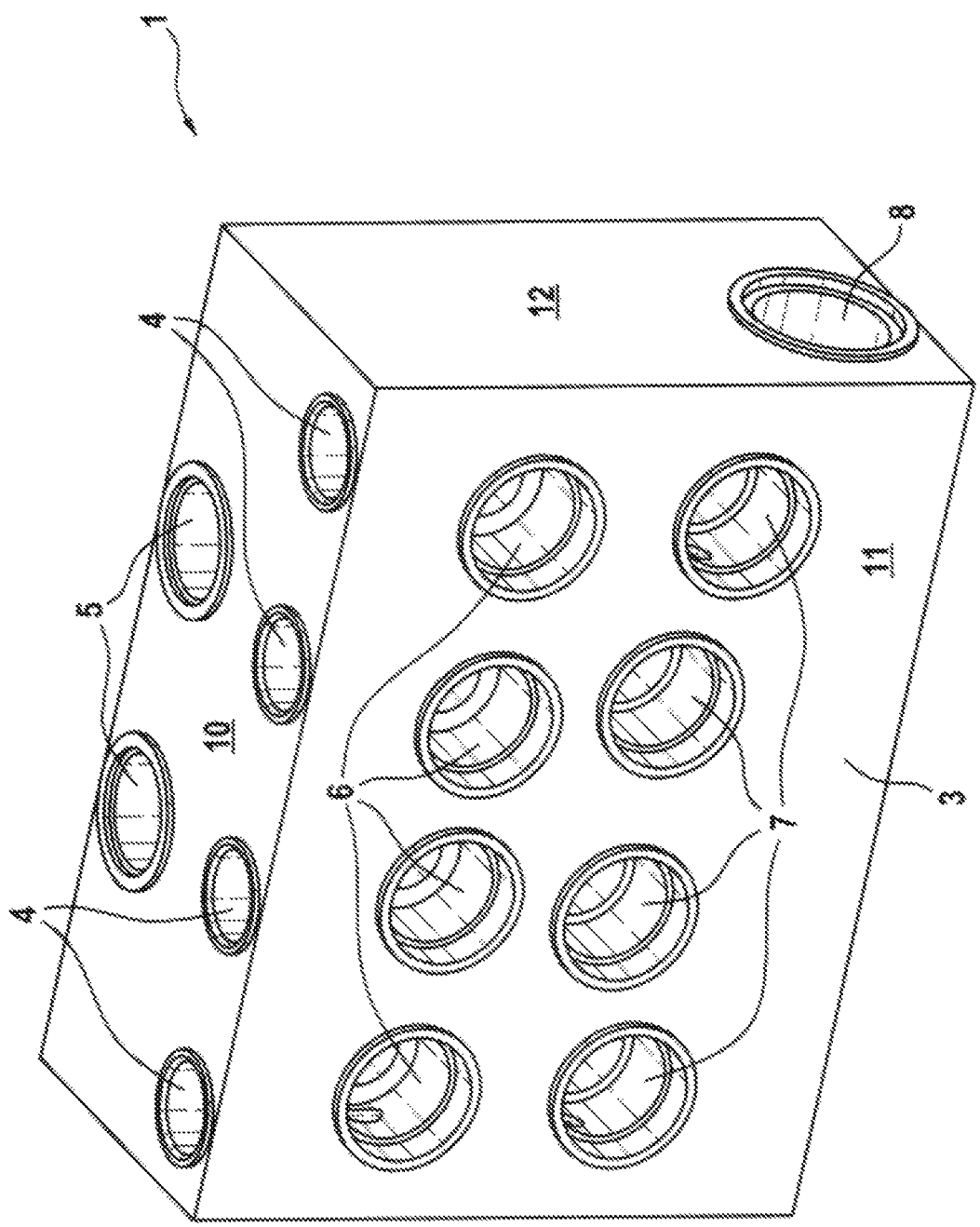
FIG. 1 a hydraulic block according to the disclosure in perspective view.

The hydraulic block 1 according to the disclosure, shown in FIG. 1, serves for mechanical fixing and hydraulic connection of components of a brake pressure control system of a hydraulic vehicle brake system. The brake pressure control system may be a system controlling a hydraulic brake pressure, including production of the hydraulic brake pressure on external power braking, and/or slip control, wherein for slip control, wheel brake pressures are regulated preferably individually in hydraulic wheel brakes. Slip control systems include anti-lock brake systems, traction control systems and driving dynamic control systems, also known as an electronic stability program and generally as an anti-skid control system. The abbreviations ABS, ASR, and FDR or ESP are conventionally used for these systems. Such brake pressure control systems are known and not explained here.

Hydraulic components of a brake pressure control system include solenoid valves, check valves, hydraulic pumps, hydraulic accumulators, damper chambers and pressure sensors. The list is not necessarily complete. The hydraulic pumps are usually piston pumps which are also known as pump elements; however, other hydraulic pumps may be used, such as for example (internal) gear pumps. Normally, the hydraulic pumps are driven by an electric motor arranged on the outside of the hydraulic block. Also, often an electronic control unit for controlling the components of the slip control system and brake pressure control system is also arranged on the outside of the hydraulic block.

"Hydraulic connection" means a hydraulic connection of the components according to a hydraulic circuit diagram of the brake pressure control system. Equipped with the components of the brake pressure control system, the hydraulic block 1 forms a hydraulic assembly for the brake pressure control system.

Figure 2:
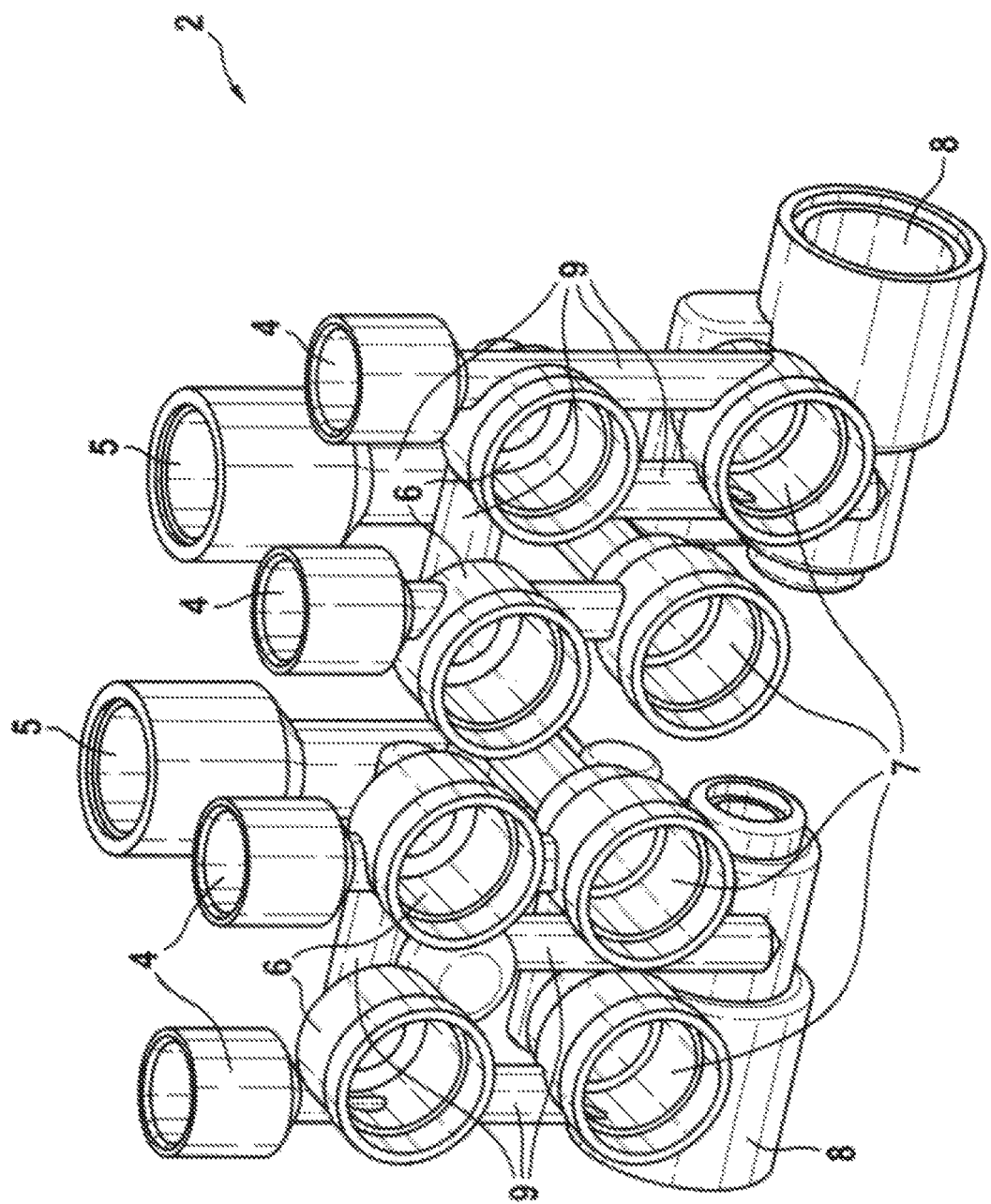
FIG. 2 a metal part of the hydraulic block from FIG. 1.

The hydraulic block 1 is a metal-plastic composite part with a metal part 2 which is embedded in a plastic part 3. The metal part 2 is shown as an individual part in FIG. 2. The plastic part 3 may generally be described as another part or a further part. The plastic part 3 or the hydraulic block 1 as a whole are cuboid, wherein other forms are possible.

The metal part 2 is produced by casting, for example by metal injection molding, 3-D metal printing or precision casting. It has six brake line ports 4, 5, eight valve receptacles 6, 7, and two pump receptacles 8. The brake line ports 4, 5, valve receptacles 6, 7 and pump receptacles 8 are sleeve-like with different sizes and shapes, and in some cases have stepped diameters. The brake line ports 4, 5, valve receptacles 6, 7 and pump receptacles 8 are connected by pipes forming connecting lines 9, which connect the brake line ports 4, 5, valve receptacles 6, 7 and pump receptacles 8 together mechanically and hydraulically according to the hydraulic circuit diagram of the brake pressure control system.

The metal part 2 embedded in the plastic part 3 has thin walls, i.e. the walls of the sleeve-like brake line ports 4, 5, valve receptacles 6, 7, pump receptacles 8 and connecting lines 7 are no thicker than a diameter or a radius of the brake line ports 4, 5, valve receptacles 6, 7, pump receptacles 8 and connecting lines 9. In the embodiment depicted and described, the walls of the brake line ports 4, 5, valve receptacles 6, 7 and pump receptacles 8 are no thicker than a radius of the connecting lines 9.

Four of the brake line ports 4 are provided for connection of hydraulic wheel brakes (not shown), and two of the brake line ports 5 are provided for connection of the hydraulic block 1 to a brake master cylinder (not shown). The wheel brakes and the brake master cylinder are connected by brake lines with screw nipples or press-in nipples (not shown). The four brake line ports 4 for the wheel brakes are arranged next to each other in a straight line on the metal part 2 so that, on the finished hydraulic block 1, they are embedded in the plastic part 3 on a transverse side of the hydraulic block 1. This transverse side of the hydraulic block 1 is therefore called the connecting side 10. In the embodiment depicted and described, it is longer than the longitudinal sides of the hydraulic block 1.

The two brake line ports 5 for the brake master cylinder are also arranged in the connecting side 10 of the hydraulic block 1, offset to the row of brake line ports 4 for the wheel brakes. The openings of the brake line ports 4, 5 are flush with the connecting side 10 of the hydraulic block 1.

The also sleeve-shaped valve receptacles 6, 7 are arranged on the metal part 2 so that they are situated on one of two mutually opposing large sides of the finished hydraulic block 1 adjacent to the connecting side 10. The side with the valve receptacles 6, 7 is here designated the valve side 11 of the hydraulic block 1. The openings of the valve receptacles 6, 7 are flush with the valve side 11. The eight valve receptacles 6 in total are arranged in the hydraulic block 1 in two rows parallel to the connecting side 10, each with four valve receptacles 6, 7, wherein four valve receptacles 6 for inlet valves of the brake pressure control system are arranged in a first row close to the connecting side 10, and four valve receptacles 7 for outlet valves of the brake pressure control system are arranged in the valve side 11 of the hydraulic block 1 in a second row on a side of the valve receptacles 6 for the inlet valves facing away from the connecting side 10.

The valve receptacles 6, 7 are provided to receive solenoid valves (not shown), namely four inlet valves and four outlet valves of the brake pressure control system. Hydraulic parts of the solenoid valves are arranged in the valve receptacles 6, 7, and valve domes protrude from the valve side 11 of the hydraulic block 1. The hydraulic parts of the solenoid valves contain shut-off bodies and valve seats for the solenoid valves and form the actual valves, while the valve domes contain an armature for actuation of the valves. Annular magnetic coils are placed on the valve domes, and are therefore also situated externally on the valve side 11 of the hydraulic block 1.

The two sleeve-shaped pump receptacles 8 with stepped diameter are arranged coaxially opposite each other on the metal part 2 so that, in the finished hydraulic block 1, they are arranged parallel to the transverse sides and the large sides, and hence parallel to the connecting side 10 and the valve side 11 of the cuboid hydraulic block 1. The openings of the two pump receptacles 8 are flush with the longitudinal sides of the hydraulic block 1 which, in the embodiment depicted and described, are shorter than the transverse sides, which is not however essential to the disclosure. The longitudinal sides of the hydraulic block 1 are here known as the pump sides 12.

The two pump receptacles 8 serve to receive two piston pumps (not shown) which may also be described as pump elements and form hydraulic pumps of the brake pressure control system. The two piston or hydraulic pumps are driven by means of a cam which is arranged between them and can be driven by an electric motor. The cam, not visible in the drawing, is situated in a cam chamber (also not shown) in the plastic part 3 of the hydraulic block 1. The cam chamber is a cylindrical depression in the valve side 11 or, as in the embodiment depicted and described, in a motor side of the hydraulic block 1 opposite the connecting side 10. The two pump receptacles 8 open radially into the cam chamber. The electric motor (not shown) is arranged on the plastic part 3 at an opening of the cam chamber, i.e. on the valve side 11 or motor side of the hydraulic block 1.

The pipes of the metal part 2 forming the connecting lines 9 connect the brake line ports 4, 5, valve receptacles 6, 7 and the pump receptacles 8 together mechanically and hydraulically according to the hydraulic circuit diagram of the brake pressure control system.

After production of the metal part 2 by casting, the metal part 2 is embedded in the plastic part 3, wherein the plastic part 3 is also cast, in that a plastic forming the plastic part 3 is injection-molded around the metal part 2 so as to form the cuboid hydraulic block 1. Equipped with the components of the brake pressure control system, i.e. the solenoid valves, hydraulic pumps and further components (not shown), such as check valves, hydraulic accumulators, damper chambers and pressure sensors, the hydraulic block 1 forms a hydraulic assembly for the brake pressure control system. The term "equipped" here means an arrangement or attachment of the components of the brake pressure control system at the intended points on or in the hydraulic block 1. The plastic part 2 in which the metal part 1 is embedded mechanically supports the brake line ports 4, 5, valve receptacles 6, 7 and pump receptacles 8, so that the metal part 1 need not alone absorb the mechanical loads acting on and exerted by the components.

The metal part 2 contains all receptacles and elements which may be loaded with brake pressure (high pressure) during brake pressure regulation, including brake pressure production by the hydraulic pumps and/or brake master cylinder. These are the brake line ports 4, 5, valve receptacles 6, 7, pump receptacles 8 and connecting lines 9. The metal part 2 also contains receptacles for check valves, damper chambers and pressure sensors, insofar as these may be loaded with brake pressure. Receptacles for components of the brake pressure control system which are not loaded with brake pressure, such as hydraulic accumulators, may also be provided on the metal part 2 or in the plastic part 3 (not shown).

What is claimed is:

1. A hydraulic block for a hydraulic assembly of a brake pressure control system of a hydraulic vehicle brake system, comprising:
   a metal composite part comprising a metal part and a further part, the metal part defining a plurality of brake line ports, a plurality of valve receptacles, a plurality of pump receptacles, and a plurality of connecting lines,
   wherein the metal part is embedded in the further part,
   wherein the plurality of brake line ports, the plurality of valve receptacles, the plurality of pump receptacles, and the plurality of connecting lines includes all receptacles and elements of the hydraulic block that are configured to be exposed to brake pressure such that the metal part encloses all receptacles and elements of the hydraulic block that are configured to be exposed to brake pressure, and
   wherein the plurality of brake line ports, the plurality of valve receptacles, the plurality of pump receptacles, and the plurality of connecting lines all have wall thicknesses that are no thicker than a radius of the plurality of connecting lines.

2. The hydraulic block according to claim 1, wherein (i) at least one of the brake line ports, the valve receptacles, and the pump receptacles is sleeve-shaped and/or (ii) the connecting lines are pipes.

3. The hydraulic block according to claim 1, wherein the metal part is formed by casting, metal casting, precision casting, metal injection-molding, or 3D metal printing.

4. The hydraulic block according to claim 1, wherein the further part is formed from plastic.

5. The hydraulic block according to claim 1, wherein the further part is molded, cast, or injection-molded around the metal part.

6. The hydraulic block according to claim 1, wherein the hydraulic block is cuboid.

* * * * *